B. F. LEET.

Wheel and Axle.

No. 96,449.

Patented Nov. 2, 1869.

Witnesses:

Jno. T. Brooks
Edgar Tate

Inventor:

B. F. Leet
PER Munn & Co.
Attorneys

United States Patent Office.

BENJAMIN F. LEET, OF DAYTON, NEVADA.

Letters Patent No. 96,449, dated November 2, 1869.

IMPROVED COMPOUND WHEEL AND AXLE.

The Schedule referred to in these Letters Patent and making part of the same.

*To all whom it may concern:*

Be it known that I, BENJAMIN F. LEET, of Dayton, in the county of Lyon, and State of Nevada, have invented a new and improved Compound Wheel and Axle; and I do hereby declare that the following is a full, clear, and exact description thereof, which will enable others skilled in the art to make and use the same, reference being had to the accompanying drawings, forming part of this specification.

This invention relates to new and useful improvements in wheels and axles for railroad-cars, whereby it is designed to provide a simple and strong arrangement of independently-revolving wheels, calculated also to utilize the wheels and axles now in use by removing one of the fixed wheels and substituting a loose wheel, according to my improvement, which consists in the application to the common railroad-car-axle, having a solid collar shrunk on at the centre, of wheels having a hollow stem projecting from the inner faces to the said collars, and held in place by loose sleeves, made in two parts having internal flanges, which engage behind shoulders of projecting rims on the inner ends of the stems, and hold them against the ends of the collars shrunk on the axles.

These loose wheels are provided with friction-rollers at the outer and inner bearings, and the stems of the wheels, and the loose sleeves which hold them on the axles, are provided with oil-chambers, having capacity for large supplies of oil.

Similar letters of reference indicate corresponding parts.

Figure 1:
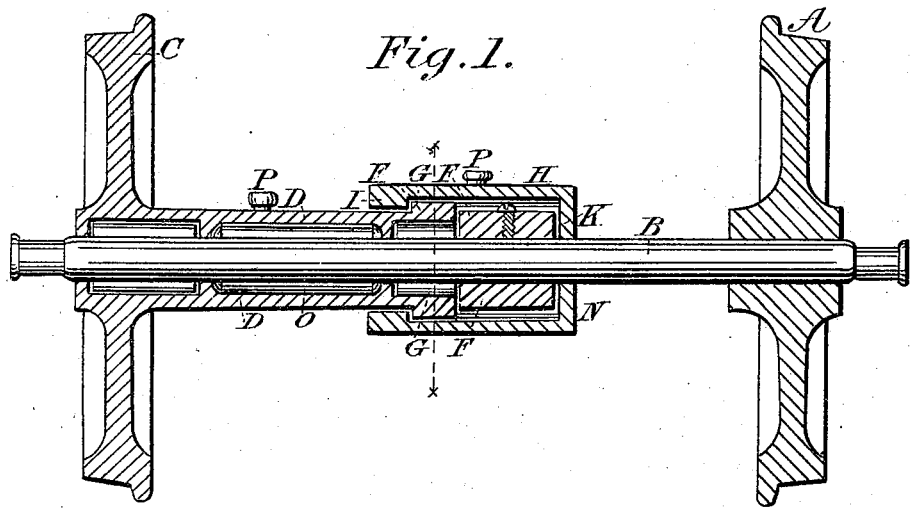
Figure 1 is a longitudinal section through the axle and wheels.
Figure 2:
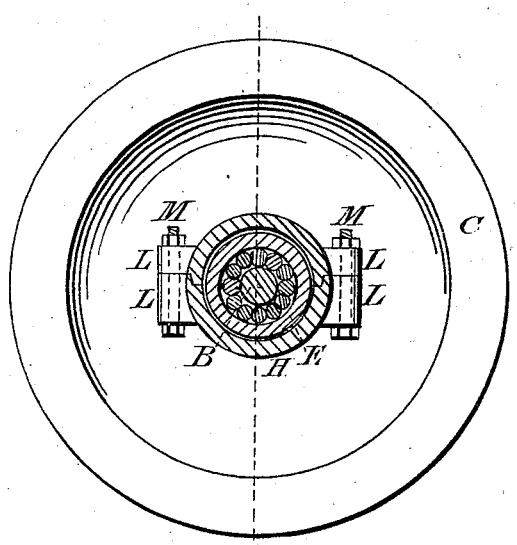
Figure 2 is a transverse section, through the loose sleeve and axle, on the line *x x* of fig. 1.

B is the axle, and A, a fixed wheel thereon, of the common arrangement.

To the opposite end of the axle, I apply a loose wheel, C, having a hollow stem, D, extending to or nearly to the centre of the axle, and bearing at the inner end (which is cast or formed with a shoulder and projection, E,) against a strong collar, F, shrunk on the axle.

This stem is bored out at each end, for the reception of friction-rollers G, for bearing upon the axle, and it is held against the end of the collar F to prevent end motion by a loose sleeve, H, made in two parts, and having internal flanges, I K, taking against the shoulders at the outer end of the shoulders and projections E and collar F.

The said sleeve H is provided with lugs, L, through which bolts pass for screwing the lugs together, to hold the sleeve in place on the axle.

Both this sleeve H and the stem D of the wheel are chambered, as at N O, to provide oil-chambers, into which the oil may be poured through small holes, closed by screw-plugs P P.

I propose also, when required, to place two of these loose wheels C, with stems on the axle holding them against the collar F, in the same way by the sleeve H, thereby providing for each wheel to revolve independently of the other and of the axle.

It will be seen that by this arrangement the axle is greatly strengthened by the support afforded by the collar P, and the extensions of the wheels, removing the objections existing to the axles divided at the centre.

The friction-rollers G may be dispensed with, if preferred, and I propose to use them or not, as found best.

It will be observed that by this arrangement of two loose wheels on the shaft, the tendency of the journals to heat will be very much reduced, if not wholly prevented, for if the axle journals become dry, the axle will cease to revolve, and the wheels will run on it, or if the bearings of the wheel become dry, the axles all turn in their bearings.

It will also be observed that the bearing-surfaces of the loose wheels are at the under side, whereby they will be more effectively lubricated.

Having thus described my invention,

I claim as new, and desire to secure by Letters Patent—

The combination, with the axle B and wheel A, permanently connected thereto, of the loose wheel C, and stem, collar F, and sleeve H, the stem D or wheel being either provided with friction-rollers or not, all substantially as specified.

The above specification of my invention signed by me, this 16th day of September, 1869.

B. F. LEET.

Witnesses:
 GEO. W. MABEE,
 ALEX. F. ROBERTS.